(12) United States Patent
Khan et al.

(10) Patent No.: US 12,254,115 B2
(45) Date of Patent: *Mar. 18, 2025

(54) SYSTEM AND METHOD FOR OBJECTIVE QUANTIFICATION AND MITIGATION OF PRIVACY RISK

(71) Applicant: Truata Limited, Dublin (IE)

(72) Inventors: Imran Khan, Dublin (IE); Michael Fenton, Greystones (IE); Maurice Coyle, Dublin (IE)

(73) Assignee: TRUATA LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,575

(22) Filed: Sep. 25, 2023

(65) Prior Publication Data
US 2024/0135035 A1 Apr. 25, 2024
US 2024/0232430 A9 Jul. 11, 2024

Related U.S. Application Data

(63) Continuation of application No. 16/813,327, filed on Mar. 9, 2020, now Pat. No. 11,768,958.

(51) Int. Cl.
*G06F 21/62* (2013.01)
*G06F 16/16* (2019.01)
(Continued)

(52) U.S. Cl.
CPC ........ *G06F 21/6254* (2013.01); *G06F 16/168* (2019.01); *G06F 16/221* (2019.01); *G06F 21/577* (2013.01)

(58) Field of Classification Search
CPC .. G06F 21/6254; G06F 16/221; G06F 16/168; G06F 21/577
See application file for complete search history.

(56) References Cited

U.S. PATENT DOCUMENTS 10,803,201 B1 10/2020 Nicholls
11,216,895 B1 * 1/2022 Schwartz .............. G06F 16/248
(Continued)

*Primary Examiner* — Stephen T Gundry
(74) *Attorney, Agent, or Firm* — Volpe Koenig

(57) ABSTRACT

A system and method for objective quantification and mitigation of privacy-risk of a dataset is disclosed. The system and method include an input-output (IO) interface for receiving at least one input dataset, on at least one of which a measurement of the risk is to be performed, and a configuration file governing the anonymization; a scoring engine including: a uniqueness sub-engine for determining uniqueness scores at data and data-subject level across both individual columns and combinations of columns; a similarity sub-engine that calculates the overlap, reproducibility and similarity by comparing all columns and subsets of columns between at least two datasets, where one dataset is the original version and the other one is transformed, modified, anonymized or synthetic version of original dataset; a statistical sub-engine that calculates statistics that are an indication of privacy-risks and re-identification risks; a contextual sub-engine for quantifying contextual factors by considering weighted approaches and producing a single context-centric score; and a recommendation engine identifying mitigating measures to reduce the privacy-risks by taking in to account the factors that are contributing to higher risk.

20 Claims, 7 Drawing Sheets

US 12,254,115 B2

Page 2

(51) Int. Cl.
  *G06F 16/22*  (2019.01)
  *G06F 21/57*  (2013.01)

(56) References Cited

U.S. PATENT DOCUMENTS

| | | | |
|---|---|---|---|
| 11,232,383 B1* | 1/2022 | Burns, Sr. | G06Q 10/0637 |
| 11,341,447 B2* | 5/2022 | Brannon | G06F 21/552 |
| 2011/0258206 A1 | 10/2011 | El Emam | |
| 2017/0083719 A1 | 3/2017 | Scaiano | |
| 2018/0004978 A1 | 1/2018 | Hebert | |
| 2018/0075104 A1 | 3/2018 | Oberbreckling | |
| 2018/0114037 A1 | 4/2018 | Scaiano | |
| 2019/0266353 A1 | 8/2019 | Gkoulalas-Divanis | |
| 2021/0049282 A1 | 2/2021 | Di Valentino | |
| 2021/0112101 A1 | 4/2021 | Crabtree | |
| 2021/0165913 A1 | 6/2021 | Besanson | |
| 2021/0279367 A1 | 9/2021 | Khan | |
| 2022/0006840 A1* | 1/2022 | Ng | G06Q 40/06 |
| 2022/0012672 A1* | 1/2022 | Inman | G06Q 10/1053 |
| 2022/0012814 A1* | 1/2022 | Crabtree | G06N 5/045 |
| 2022/0014561 A1* | 1/2022 | Caceres | G06F 16/2477 |
| 2022/0030009 A1* | 1/2022 | Hasan | H04L 63/1491 |
| 2022/0050921 A1* | 2/2022 | LaFever | H04L 63/20 |
| 2022/0058747 A1* | 2/2022 | Crabtree | G06Q 40/08 |
| 2022/0060512 A1* | 2/2022 | Crabtree | G06F 16/2477 |
| 2022/0067202 A1* | 3/2022 | Nedelec | G06F 21/6254 |
| 2022/0108026 A1* | 4/2022 | Ortiz | G06F 12/1441 |
| 2022/0121731 A1* | 4/2022 | Groth | G06F 21/6263 |
| 2022/0121884 A1* | 4/2022 | Zadeh | G06N 3/006 |
| 2022/0126864 A1* | 4/2022 | Moustafa | G06T 1/0007 |
| 2022/0138280 A1* | 5/2022 | Riggs | G06F 16/24578 707/737 |
| 2022/0166789 A1* | 5/2022 | Murray | H04L 63/1416 |
| 2022/0198779 A1* | 6/2022 | Saraee | G06F 16/9535 |
| 2022/0201042 A1* | 6/2022 | Crabtree | G06F 16/2477 |
| 2022/0210200 A1* | 6/2022 | Crabtree | G06F 16/951 |
| 2022/0245539 A1* | 8/2022 | Clearwater | G06Q 10/0635 |

* cited by examiner

SYSTEM AND METHOD FOR OBJECTIVE QUANTIFICATION AND MITIGATION OF PRIVACY RISK

CROSS REFERENCE TO RELATED APPLICATIONS

This application is a continuation of U.S. patent application Ser. No. 16/813,327, filed Mar. 9, 2020, which is incorporated by reference as if fully set forth.

FIELD OF INVENTION

The present invention is directed to a system and method for quantification of privacy-risks in datasets, and more particularly a system and method for objective quantification and mitigation of privacy-risks and a risk-based anonymization recommender system for datasets.

BACKGROUND

Today the world operates on data. This is true in science, business and even sports. Medical, behavioral, and socio-demographic data are all prevalent in today's data-driven research. However, the collection and use of such data raise legitimate privacy concerns. Therefore, companies frequently want to produce anonymized datasets to support the company's internal or external uses cases. Examples of these use cases include load testing, data analytics, driving valuable insights, product development, e-commerce personalization, and vendor selection. Each of these uses may have specific requirements regarding the level of utility included in the resulting dataset. At the same time, the context of the dataset usage affects the privacy characteristics and requirements surrounding the data.

Systematically measuring and quantifying privacy-risk is non-trivial and possibly involves subjectivity. Little attention has been paid to measuring privacy-risk. Any attempts made to measure privacy-risk consider the datasets and ignore the context. This neglects any contextual factors contributing to the privacy-risk, for example whether the data is being released to the public or whether it will be purely used internally. The state-of-the-art lacks approaches that take these contextual factors into account to compute quantitative privacy-risk scores that enable evaluators or regulators to understand the privacy-risks involved in the process of anonymization and subsequently define thresholds to make an informed decision about whether or not to release or use a dataset.

SUMMARY

The described system and method provide the ability to quantitatively measure privacy-risks while also considering contextual factors to measure privacy-risks. The system and method produces a privacy-risk score by considering contextual and data-centric aspects of the dataset. The system produces a context-centric privacy-risk score by considering contextual factors and a data-centric privacy-risk score by considering the dataset based on the outputs of a number of metrics engines. The metrics engines measure and quantify privacy-risk by analyzing different aspects of the dataset including, but not limited to, similarity and uniqueness. The context-centric privacy-risk score and data-centric privacy-risk score may be composed to generate a single quantitative privacy-score. Additionally, the system and method provide a risk matrix that lists the scores for data-centric atomic metrics as well as a score for each contextual factor.

A system and method for objective quantification and mitigation of privacy-risk of datasets is disclosed. The system and method include an input-output (10) interface for receiving at least one input dataset, on at least one of which a measurement of the risk is to be performed, and a configuration file governing the risk quantification and potential mitigation actions, a scoring engine including: a uniqueness sub-engine for determining whether each of the records in the input dataset is unique in a population set at data-subject level, data level, and computing the scores for uniqueness; a similarity sub-engine for comparing two datasets (one original dataset as reference and a transformed version comparison dataset that for instance is a synthesized, anonymized, de-identified, pseudonymized version of the original dataset), calculating similarity between the datasets and producing similarity scores; a statistical sub-engine for computing statistics and distributions over the given input dataset or datasets; and a contextual sub-engine for quantifying contextual factors by considering weighted approaches and producing a single context-centric score; and a recommendation engine identifying mitigation measures to reduce the identified privacy-risks.

BRIEF DESCRIPTION OF THE DRAWINGS

A more detailed understanding can be had from the following description, given by way of example in conjunction with the accompanying drawings wherein.

DETAILED DESCRIPTION

The described system and method provide the ability to quantitatively measure privacy-risk and account for contextual factors to measure privacy-risks and provide a quantified score. The system and method measure a privacy-risk score while taking the contextual features (context-centric privacy-risk score) and the dataset (data-centric privacy-risk score) in to account based on the outputs of a number of metrics. Engines that measure different aspects of the dataset including, but not limited to, similarity and uniqueness metrics. The context-centric privacy-risk score and data-centric privacy-risk score are composed to generate a single quantitative privacy score. Additionally, the system and method provide a risk matrix that lists the scores for data-centric atomic metrics as well as a score for each contextual factor.

Anonymization or de-identification of the dataset may be performed using various methods, including but not limited to, deleting direct personal identifiers in the dataset, replacing identifiers with tokens, perturbing and shuffling the values, generalizing and/or adding noise based on differential privacy methods. In the context of data analysis, re-identification risk is the risk of singling out an individual, the linking of records or matching of data between datasets, or inference of any information about individual or individuals from a dataset.

A system and method for objective quantification and mitigation of privacy-risk of a dataset is disclosed. The system and method include an input-output (IO) interface for receiving at least one input dataset, on at least one of which a measurement of the risk is to be performed, and a configuration file governing the anonymization, a scoring engine including: a uniqueness sub-engine that determines the uniqueness of an individual's records at data subject-level as well as at data-level and also across entire records as well as subsets of columns within the given dataset and outputs uniqueness scores; a similarity sub-engine that compares and computes the similarity between two datasets in terms of data reproduction or overlap that exists between them, by directly comparing entire records as well as the subsets of columns and produces similarity scores; a statistical sub-engine that computes statistics for the given dataset in order to find indications of potential privacy-risks/re-identification risks and to find overt re-identification risks in terms of outliers, including potential risks specified in the configuration file; a contextual sub-engine for quantifying contextual factors by considering weighted approaches and producing a single context-centric score; and a recommendation engine that identifies mitigation measures and techniques to reduce the discovered privacy-risks by taking in to account the factors that are contributing to higher risk.

Figure 1:
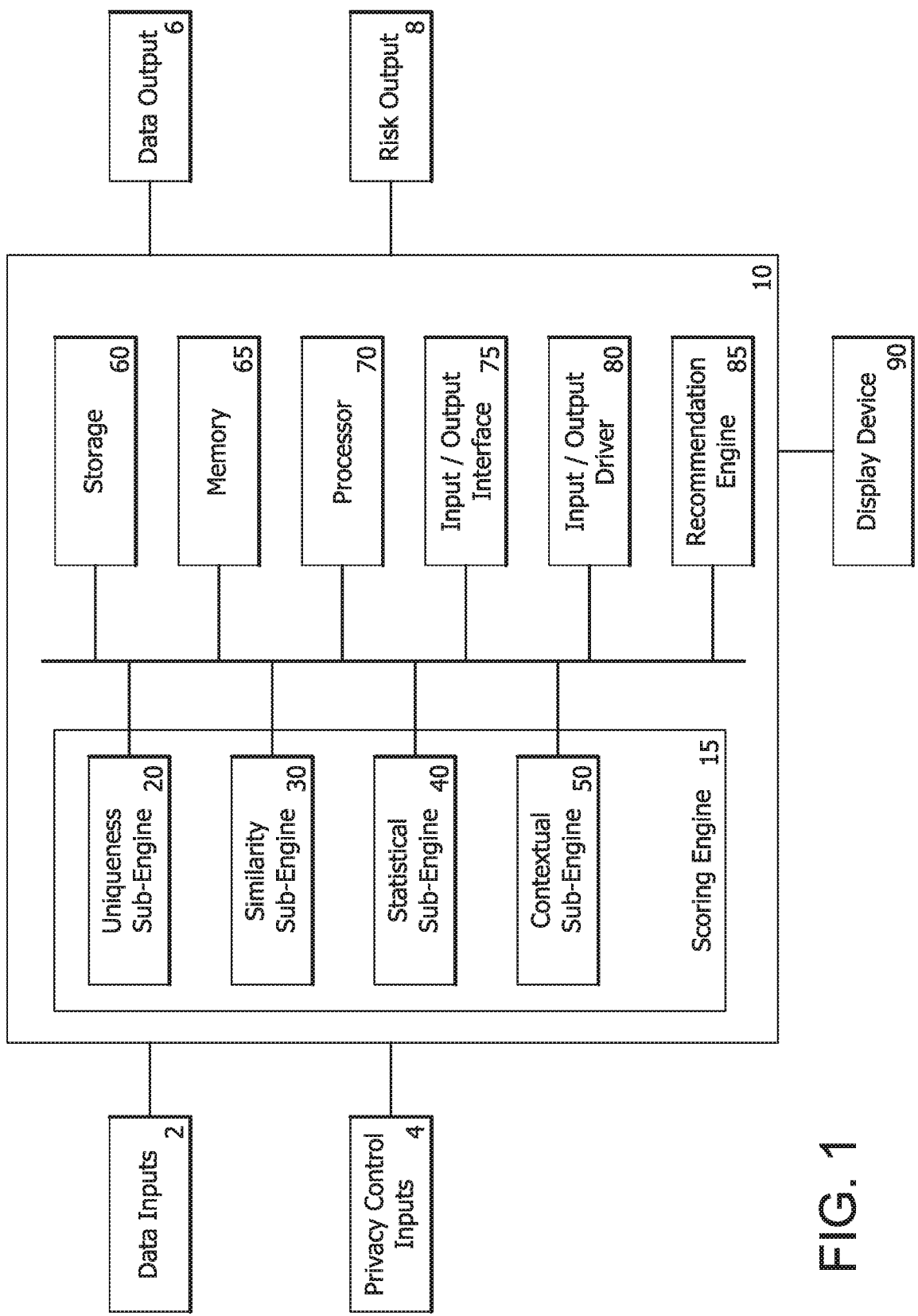
FIG. 1 illustrates a system for objective quantification and mitigation of privacy-risk.

FIG. 1 illustrates a system 10 for objective risk quantification. System 10 receives inputs including data inputs 2 and privacy control inputs 4. System 10 produces outputs including data output 6 and risk output 8. System 10 operates using a processor 70 with input/output interface 75 and input/output driver 80. System includes storage 60 and memory 65. System 10 includes a scoring engine 15, which includes a uniqueness sub-engine 20, a similarity sub-engine 30, a statistical sub-engine 40 and contextual sub-engine 50, and a recommendation engine 85.

As would be understood by those possessing an ordinary skill in the pertinent arts, scoring engine 15, including uniqueness sub-engine 20, similarity sub-engine 30, statistical sub-engine 40 and contextual sub-engine 50, may be interconnected via a bus, and may be placed in storage 60 and/or memory 65 and acted on by processor 70. Information and data may be passed to scoring engine 15 and the sub-engines including uniqueness sub-engine 20, similarity sub-engine 30, statistical sub-engine 40 and contextual sub-engine 50 internally to system 10 via a bus and this information and data may be received and sent via input/output interface 75.

Data inputs 2 may include an input dataset. By way of example, an example dataset is provided in Table 1. Data inputs 2 include datasets that are desired to be configured with privacy according to the defined privacy control inputs 4. Generally, data inputs 2 may include data such as 1 million or more credit card transactions, for example. Generally, data inputs 2 are formatted in a row and columnar configuration. The various columns may include specific information on the transaction included within the row. For example, using the credit card transaction example, one row may refer to a particular transaction. The columns in that row may include name, location, credit card number, CVV, signature, and swipe information for example. This provides a row representation of transactions and the columns referring to specific information about the transaction arranged in a columnar fashion. An exemplary sample data inputs 2 dataset is provided below in Table 1. The exemplary dataset includes customer ID, name, payment method, city, gender, weekly amount, and frequency of purchase in the columns of the dataset and particular entries within the dataset for individuals represented in each of the columns of the dataset.

TABLE 1

Example Dataset 1

| Customer ID | Name | Payment method | City | Gender | Weekly amount | Frequency of purchase |
|---|---|---|---|---|---|---|
| 837001 | Steve | Online | London | M | 234 | 11 |
| 837002 | Tom | Online | New York | F | 456 | 23 |
| 837003 | James | Online | Dublin | M | 456 | 76 |
| 837004 | Zach | Online | Cork | F | 4567 | 7 |
| 837005 | Steve | Online | Manchester | M | 32 | 2 |
| 837006 | John | Online | Dallas | M | 67 | 8 |
| 837007 | Nisha | Online | New York | M | 342 | 2 |
| 837008 | Sylvie | Online | Paris | F | 76 | 76 |
| 837009 | Lukas | Online | Berlin | M | 235 | 22 |
| 837010 | Kate | Online | Frankfurt | F | 23 | 7 |
| 837011 | Scott | Online | Tokyo | M | 7232 | 24 |
| 837012 | John | Online | Berlin | M | 54 | 17 |

A second example dataset is provided in Table 2.

TABLE 2

Example Dataset 2

| Customer ID | Name | Payment method | City | Gender | Weekly amount | Frequency of purchase |
|---|---|---|---|---|---|---|
| 534543 | James | Online | London | M | 234 | 13 |
| 456237 | Steve | Online | New York | F | 428 | 22 |
| 776444 | Tom | Online | Dublin | M | 429 | 73 |
| 224674 | John | Online | Cork | F | 4382 | 6 |
| 145783 | Steve | Online | Manchester | M | 55 | 3 |
| 234433 | John | Online | Dallas | M | 23 | 9 |
| 222556 | Nisha | Online | New York | M | 359 | 3 |
| 777433 | Kate | Online | Paris | F | 76 | 58 |
| 235679 | Lukas | Online | Berlin | M | 255 | 21 |
| 94842 | Sylvie | Online | Frankfurt | F | 20 | 5 |
| 93649 | Scott | Online | Tokyo | M | 7223 | 22 |
| 28461 | John | Online | Berlin | M | 45 | 14 |

Privacy control inputs 4 include inputs that prescribe or dictate the requirements of the risk assessment of the dataset(s) and the scoring thereof. Privacy control inputs 4 may take the form of a computer file, for example. In a specific embodiment, privacy control inputs 4 may be a configuration file that is in a defined format. For example, an .INI or CONFIG file may be used. Privacy control inputs 4 may include, for example, data profile including column identifiers, quasi-identifiers, and the like, contextual risk factors, and input parameters. The privacy control inputs 4 may include, for example, whether the risk assessment and scoring is to be performed for a single dataset or two datasets, one being the original dataset and the second is the comparison (e.g., anonymized or synthetic) version of the dataset. An example configuration file for privacy control inputs 4 is included in Table 3.

TABLE 3

Example Input Configuration File

[DATA PROFILE]
   identifiers_columns = [Customer_ID]
   quasi_identifiers_columns = [Name, City, Gender,
   Frequency_of_purchase, City]
   sensitive_columns = [Weekly_amount]
   ignore_columns = [Payment_method]
[CONTEXTUAL RISK FACTORS]
   contextual_factor_1 = True
   contextual_factor_2 = True
   contextual_factor_3 = False
   contextual_factor_4 = True
   contextual_factor_5 = True
   contextual_factor_6 = False
   contextual_factor_7 = False
   contextual_factor_8 = False
   contextual_factor_9 = True
   contextual_factor_10 = True
   contextual_factor_11 = False
   contextual_factor_12 = False
   contextual_factor_13 = True
   contextual_factor_14 = True
[INPUT PARAMETERS]
   recommendations = True
   number_of_input_dataset = 2
   original_dataset = dataset_1 # required in case of two
   datasets, one is original and the other would be a comparison
   version of the input dataset or some other dataset to be
   compared.
   comparison_dataset = dataset_2
   Privacy_Defintion = None # other values include k-anonymity,
   l-diversity, t-closeness.

The content of the privacy control input may include details on risk assessment and risk scoring requirements. This may include the number of datasets, whether the recommendations are turned on, and whether the dataset must comply with a formal privacy definition, including k-anonymity, l-diversity or t-closeness by example.

Uniqueness sub-engine 20 provides a uniqueness analysis of the data input 2 and the ability for each of the records to be unique in a population set from various aspects by considering attributes in the records in isolation, as well as in combination with other attributes (quasi-identifiers). Uniqueness sub-engine 20 searches through the dataset to find hidden re-identification risks in terms of uniqueness. Additionally, the uniqueness sub-engine 20 quantifies how strongly an attribute that is a quasi-identifier or combination of (quasi-identifier) attributes is correlated with the identifiers in the dataset.

Uniqueness sub-engine 20 receives as input the data inputs 2 and the specified privacy control inputs 4. Uniqueness sub-engine 20 operates to determine whether each of the records in the input dataset is unique in a population set at data-subject level, data level, and computes the scores for uniqueness. Uniqueness sub-engine 20 then operates to determine the score for data uniqueness with the data inputs 2. Scoring in the scoring engine 15 and the uniqueness sub-engine 20 is described in FIG. 3 and the scoring in the uniqueness sub-engine 20 is further described with respect to FIG. 4.

Similarity sub-engine 30 receives as input the data inputs 2 and the specified privacy control inputs 4. Similarity sub-engine 30 calculates similarity on the data using similarity metrics such as (but not limited to) one to one, one to many, many to one, same to same, any to any row-level similarity measures for combinations of attributes (columns) to discover the risk of re-identification. Subsequently, the similarity sub-engine 30 determines similarity scores for each row-level similarity metric, combines all the similarity scores into a single score and produces a similarity report for the given datasets.

Based on the desired configuration, similarity sub-engine 30 checks the specification, such as defined in privacy control inputs 4, for the required dataset. The unified scoring engine 15 and the similarity sub-engine 30 is described in FIG. 3 and the components of similarity sub-engine 30 in-terms of similarity metrics are further described with respect to FIG. 5.

Statistical sub-engine 40 receives as input the data inputs 2 and the specified privacy control inputs 4. Statistical sub-engine 40 computes various statistical properties about the data, measures statistical characteristics that capture information about input datasets which can be used to determine the level of re-identification risk the input datasets contain. The scoring engine 15 and the statistical sub-engine 40 is described in FIG. 3 and the components in the statistical sub-engine 40 is further described with respect to FIG. 6.

Contextual sub-engine 50 receives as input the data inputs 2 and the specified privacy control inputs 4. Contextual sub-engine 50 computes a context-centric privacy-risk score by considering specified contextual factors specified in configuration file for the given input dataset. Additionally, contextual sub-engine 50 combines the score into one single contextual score. The scoring engine 15 and the contextual sub-engine 50 is described in FIG. 3 and the components of the contextual sub-engine 50 is further described with respect to FIG. 7.

Recommendation engine 85 receives the data inputs 2 and privacy control inputs as well as the outputs from each of the scoring engines 15, including uniqueness sub-engine 20, similarity sub-engine 30, statistical sub-engine 40 and contextual sub-engine 50, in order to recommend process(es) to reduce identified privacy-risks. For example, recommendation engine 85 may indicate that privacy-risk is high due to "Factor 5". "Factor 5" needs to be reviewed. Alternatively, attributes A, B, C, D need attention. Recommendation engine 85 recommends additional generalization of attribute D.

Recommendation engine 85 enables a user or a system, such as system 10, to take mitigating measures to reduce the privacy-risks by taking into account the factors that are contributing to higher risk. For example, if the data-centric risk is high the user can deploy additional anonymization approaches or stricter privacy models to reduce the risk. Another example of the operation of the recommendation engine 85 occurs when the dataset is accessible by a large number of people in an organization, recommendation engine 85 based on a certain score may recommend to decrease the number of people having access to that dataset. If configured to do so, the recommendation engine also applies configured mitigation techniques to the output data based on the risk report, including noise addition, multiplication, suppression, fuzzing, and returns the mitigated dataset, and the risk profile of the mitigated dataset.

While each of uniqueness sub-engine 20, similarity sub-engine 30, statistical sub-engine 40 and contextual sub-engine 50 are described as engines, each of these includes software and the necessary hardware to perform the functions described. For example, in computer programming, an engine is a program that performs a core or essential function for other programs. Engines are used in operating systems, subsystems or application programs to coordinate the overall operation of other programs. The term engine is also used to describe a special-purpose program that uses algorithms to query data. Each of these engines uses an algorithm to operate on data to perform a function as described.

A check unit (not shown in FIG. 1, but see FIG. 3) may be included within system 10. Check unit may be included within the scoring engine 15 and/or may be included individually within system 10. Check unit may perform a threshold check on the dataset outputted from the scoring engine 15, or any of the sub-engines 20, 30, 40, 50. Such a check may determine if the risks are under the configured thresholds, deeming the data safe for the given privacy control input, and releasing the data. If the risks are not under the configured limits, then a recommendation is determined, such as from recommendation engine 85, and employed before iteratively executing the scoring engine 15, or any of the sub-engines 20, 30, 40, 50, until the risks are under the prescribed limits. This iterative step is necessary as new risks can be introduced to the output dataset through the mitigation of previous risks.

The storage 60 includes a fixed or removable storage, for example, a hard disk drive, a solid state drive, an optical disk, or a flash drive. Input devices (not shown) may include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Output devices include, without limitation, an output device 90 (display), a speaker, a printer, a haptic feedback device, one or more lights, an antenna, or a network connection (e.g., a wireless local area network card for transmission and/or reception of wireless IEEE 802 signals).

In various alternatives, the processor 70 includes a central processing unit (CPU), a graphics processing unit (GPU), a CPU and GPU located on the same die, or one or more processor cores, wherein each processor core can be a CPU or a GPU. In various alternatives, the memory 65 is located on the same die as the processor 70, or is located separately from the processor 70. The memory 65 includes a volatile or non-volatile memory, for example, random access memory (RAM), dynamic RAM, or a cache.

The input/output driver 80 communicates with the processor 70 and the input devices (not shown), and permits the processor 70 to receive input from the input devices via input/output driver 75. The input/output driver 80 communicates with the processor 70 and the output devices 90 via input/output driver 75, and permits the processor 70 to send output to the output devices 90. It is noted that the input/output driver 80 are optional components, and that the system 10 will operate in the same manner if the input/output driver 80 is not present.

Individual scores per factor in scoring engine 15 may be passed directly as outputs (data output 6, risk output 8). Data output 6 may include a single score, individual scores, including uniqueness score, similarity score, statistical score and contextual score, and recommendations via risk output 8 by illustrating the effect of each matrix/factor on the scores based on which actionable recommendation is given.

Figure 2:
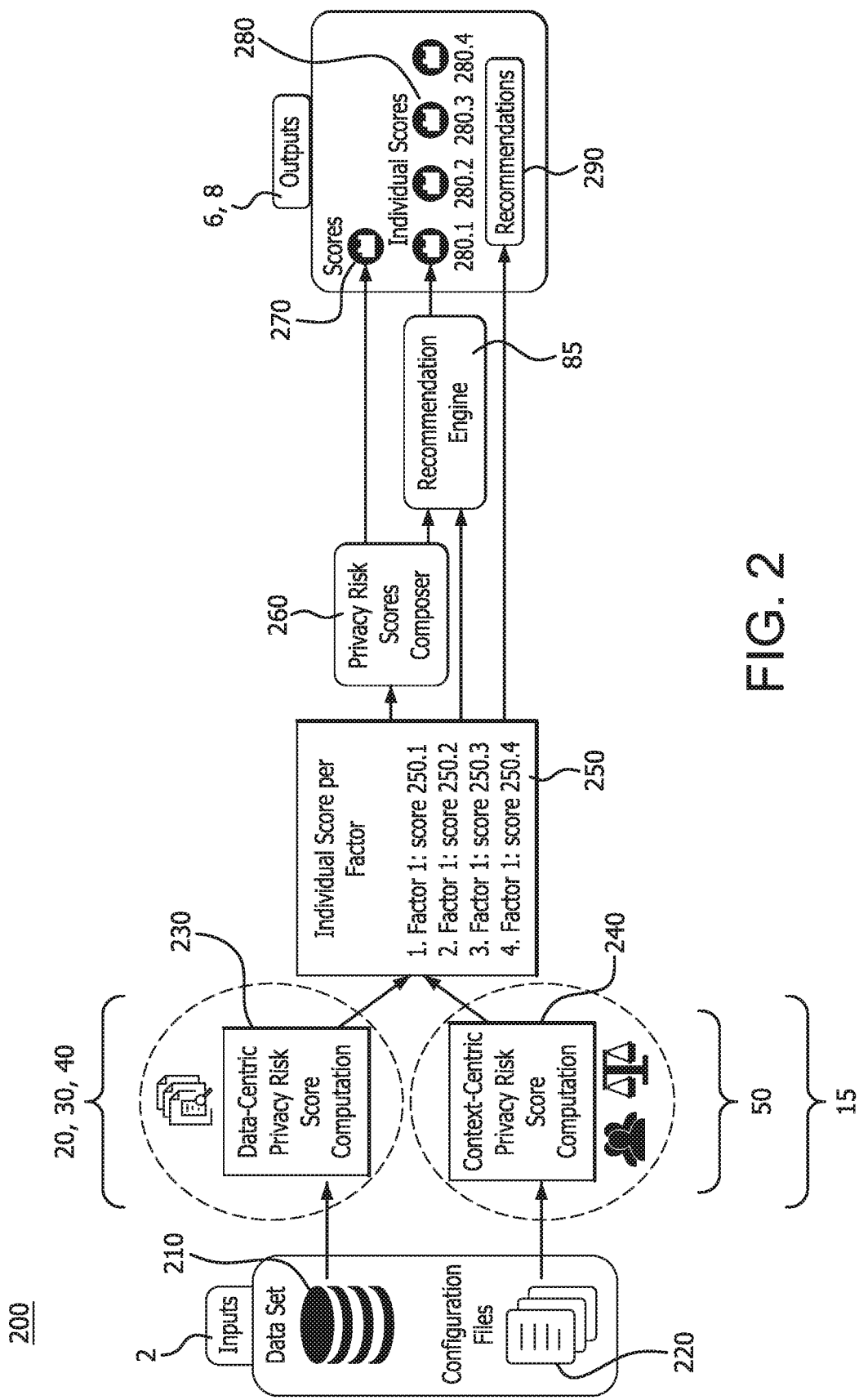
FIG. 2 illustrates a flow of data within the system of FIG. 1.

FIG. 2 illustrates a flow 200 of data within the system 10 of FIG. 1. Flow 200 is initiated by receiving inputs 2 to the system 10. Inputs 2 may include any number of datasets 210 and configuration files 220. As described by the example above, dataset 210 is a dataset that needs to be anonymized, a dataset to be used for comparison purposes, such as an anonymized dataset, a synthesized dataset or a dataset produced by executing similar code using different configuration parameters or different input data as described above. Configuration files 220 is the configuration object file.

The inputs 2 are passed to the engines 15 of the system 10. These engines 15 include contextual sub-engine 50 designed to perform a context-centric privacy-risk score computation 240. The engines 15 include uniqueness sub-engine 20, similarity sub-engine 30 and statistical sub-engine 40 that cooperatively perform data-centric privacy-risk score computation 230. The data-centric privacy-risk score computation 230 is designed in terms of similarity, uniqueness, and statistical computations.

Once each of the engines 15 operate to produce the data-centric privacy-risk score computation 230 and context-centric privacy-risk score computation 240, the values and the inputs are passed as individual scores per factor 250. These may include a factor 1 score 250.1, a factor 2 score 250.2, a factor 3 score 250.3 and a factor 4 score 250.4 (collectively individual scores per factor 250). In one embodiment, similarity metrics are calculated by measuring similarity between the quasi-identifiers identified in two datasets. In one embodiment, uniqueness computes the ability of each quasi-identifier to resolve to or single out a data subject.

Individual scores per factor 250 are passed to the privacy-risk scores composer 260. This composer 260 combines the individual scores per factor 250 into a single score 270. Single score 270 is the combination of qualitatively different metrics. In order to combine the individual factors 250 into a single score 270 in the composer 260, an addition approach or weighted approach may be used. The addition approach adds the respective underlying scores 250 equally to provide the single score 270. A weighted approach provides weights to certain scores 250, such a 2:1, 3:1, 4:1, etc., as needed. This may include addition or weighting of between similarity score 280.1, uniqueness score 280.2, statistical score 280.3 and contextual score 280.4.

Individual scores per factor 250 are also passed to the recommendation engine 85. As described above, recommendation engine 85 provides recommendations 290. Recommendations 290 may include details on how to reduce the privacy-risks, based output 1, output 2, and output 3.

Individual scores per factor 250 are also passed directly as outputs 6, 8 in a detailed risk report. This provides low-level privacy-risk score of each factor including a contextual score 280.4, a similarity score 280.1, a uniqueness score 280.2 and a statistical score 280.3. These scores 280 may be provided in a matrix.

Outputs 6, 8 include single score 270 output from composer 260, individual scores 280, including first score 280.1, second score 280.2, third score 280.3 and fourth score 280.4 (collectively individual scores 280), and recommendations 290. Output 6, 8 shows the effect of each metric and factor on the scores based on which actionable recommendation is given.

Data output 6 and risk output 8 are provided in sample form below. An example output file including data output 6 and risk output 8 is included in Table 4.

TABLE 4

Example Output Data and Risk Output

\*\*\*\*\*\*\*\*\*\*\*\*\*\*\*\*\*\*\*\*\*\*\*\*\*\*\*\*\*\*\*\*\*\*\*\*[OUTPUT]\*\*\*\*\*\*\*\*\*\*\*\*\*\*\*\*\*\*\*\*\*\*\*\*\*\*\*\*\*\*\*\*\*\*
Dataset_name: dataset_1
Number of columns = 7
Number of rows = 12
Number of numeric columns = 3
Number of categorical columns = 4
Overall quantitative privacy-risk Score (normalized between 1 to 10-10 means high and 1 mean low) = 4
\*\*\*\*\*\*\*\*\*\*\*\*\*\*\*\*\*\*\*\*\*\*\*\*[UNIQUENESS]\*\*\*\*\*\*\*\*\*\*\*\*\*\*\*\*\*\*\*\*\*\*\*\*\*\*\*\*\*\*\*\*\*\*
[UNIQUENESS SCORES - one dimensional Data-level uniqueness score]
Column[Name] = 4
Column[City] = 8
Column[Gender] = 4
Column[Frequency_of_purchase] = 4
[UNIQUENESS SCORES - one dimensional subject-level uniqueness score]
Column[Name] = 5
Column[City] = 7
Column[Gender] = 2
Column[Frequency_of_purchase] = 3
[UNIQUENESS SCORES - multi dimensional data-level uniqueness score]
Column[Name      City] = 4
Column[Name      City                       Gender ] = 8
Column[City      Gender] = 8
Column[Gender    Frequency_of_purchase] = 2
Column[City      Gender                     Frequency_of_purchase] = 6
Column[Name      City                       Gender            Frequency_of_purchase] = 3
[UNIQUENESS SCORES - multi dimensional subject-level uniqueness score]
Column[Name      City] = 4
Column[Name      City                       Gender ] = 8
Column[City      Gender] = 9
Column[Gender    Frequency_of_purchase] = 2
Column[City      Gender                     Frequency_of_purchase] = 8
Column[Name      City                       Gender            Frequency_of_purchase] = 9
SINGLE UNIQUENESS SCORE = 4
\*\*\*\*\*\*\*\*\*\*\*\*\*\*\*\*\*\*\*\*\*\*\*\*\*[SIMILARITY]\*\*\*\*\*\*\*\*\*\*\*\*\*\*\*\*\*\*\*\*\*\*\*\*\*\*\*\*\*\*\*\*\*\*\*\*\*\*\*\*
[SIMILARITY SCORES]
Similarity score 1 = 5
Similarity score 2 = 3
Similarity score 3 = 2
Similarity score 4 = 4
Similarity score 5 = 2
Similarity score 6 = 1
Similarity score 7 = 4
SINGLE SIMILARITY SCORE = 3
\*\*\*\*\*\*\*\*\*\*\*\*\*\*\*\*\*\*\*\*\*\*\*\*\*\*\*\*[STAT]\*\*\*\*\*\*\*\*\*\*\*\*\*\*\*\*\*\*\*\*\*\*\*\*\*\*\*\*\*\*\*\*\*\*\*\*\*\*\*\*
[STAT SCORES]
Stat score 1 (difference in standard deviation) = 3
Stat score 2 (difference in absolute deviation) = 2
\*\*\*\*\*\*\*\*\*\*\*\*\*\*\*\*\*\*\*\*\*\*\*\*\*\*[CONTEXTUAL]\*\*\*\*\*\*\*\*\*\*\*\*\*\*\*\*\*\*\*\*\*\*\*\*\*\*\*\*\*\*\*\*\*\*\*\*\*
[CONTEXTUAL RISK FACTORS SCORE - normalized between 1 to 10]
contextual_factor_1 = 3
contextual_factor_2 = 4
contextual_factor_3 = 0
contextual_factor_4 = 1
contextual_factor_5 = 2
contextual_factor_6 = 0
contextual_factor_7 = 0
contextual_factor_8 = 0
contextual_factor_9 = 8
contextual_factor_10 = 4
contextual_factor_11 = 0
contextual_factor_12 = 0
contextual_factor_13 = 4
contextual_factor_14 = 3
SINGLE CONTEXTUAL SCORE = 4
\*\*\*\*\*\*\*\*\*\*\*\*\*\*\*\*\*\*\*\*\*\*\*\*\*\*[RECOMMENDATIONS]\*\*\*\*\*\*\*\*\*\*\*\*\*\*\*\*\*\*\*\*\*\*\*\*\*\*\*\*\*
The privacy-risk can further be minimized by:
contextual_factor_9: Limiting access to dataset
Generalize the Column name "City"

There is a privacy-risk score, the single score 270 that can include color coding, individual privacy-risk scores 280 including similarity 280.1, uniqueness 280.2 and statistical 280.3 determined from the metrics. The contextual score 280.4 may include low-level privacy-risk score of each contextual factor, such as factor 1: 3, factor 2: 4, factor 3: 1, factor 4: 3 and factor 5: 9 (High). By way of example only, factors may include whether the data is to be released internally or to the public, whether the purpose or use case of the data is defined, whether there are externally observable attributes in the dataset, and the frequency of producing analytical reports, for example. Recommendations 290 may include that the privacy-risk is high due to "Factor 5" and "Factor 5" needs to be reviewed. Further, recommendations 290 may include A, B, C, D needs attention. Recommendation may generalize attribute D. The output of the system enables the user of the system to have an accurate estimate of privacy-risk and to take mitigating measures to reduce the privacy-risks by taking in to account the factors that are contributing in higher risk. For example, if the data-centric risk is high, the user can deploy additional anonymization approaches or stricter privacy models to reduce the risk. In other words, the technical effect of the system is the anonymized data with mitigated privacy-risks.

In the example output in Table 4, the name of the dataset is output and the properties of the dataset are included. For example, the number of rows and columns are provided, as well as the number of numeric columns and rows. As represented in the sample output, the overall quantitative privacy-risk score is also provided.

Focusing on the uniqueness output, the scores in uniqueness for one dimensional data-level uniqueness are provided based on individual columns of the dataset, the scores in uniqueness for one dimensional data subject-level uniqueness are provided based on columns of the dataset when correlated with identifier columns, the scores in uniqueness for multi-dimensional data-level uniqueness are provided based on combinations of columns of the dataset, the scores in uniqueness for multi-dimensional data subject-level uniqueness are provided based on combinations of columns of the dataset correlated with identifier columns, and a single uniqueness score is provided. The one dimensional data-level uniqueness score identifies how unique the values within one column are, the multi-dimensional data-level uniqueness identifies how unique the combination of values for a set of columns are, the one dimensional subject-level uniqueness identifies how strongly correlated the values in the column is to the subjects, and the multi-dimensional subject-level uniqueness identifies how strongly the combinations of column values are correlated to subjects. Due to the high number of potential combinations of columns in wide datasets, an optimization step 415 is included in the uniqueness sub-engine 335.

For similarity, a similarity score for certain elements are provided and a single similarity score is also provided. The similarity scores are computed using different similarity metrics, for example, one-to-one metric identifies how similar two datasets are in terms of the percentage of rows in the comparison dataset that occur exactly once in the original dataset and are there exactly once in the comparison dataset, which in essence represents the risk of singling out of an individual from the given datasets.

The statistical score provides an indication of potential privacy-risk in terms of outlier values. For instance, in case there are only few values outside the 3 standard deviation range then it is an indication that those values are outliers that may lead to the re-identification of an individual in the dataset.

For contextual risk factors, a contextual risk factor score is provided, as well as scores for each identified contextual factors. The contextual factor scores represent the strength/amplification ability of each factor to influence the privacy risk inherent in the datasets.

The output may also include the recommendations, which in the exemplary output in Table 4 illustrates that the privacy-risks can further be minimized by limiting access to the dataset, based on contextual factor 9, and by generalizing the column name to "city."

Figure 3:
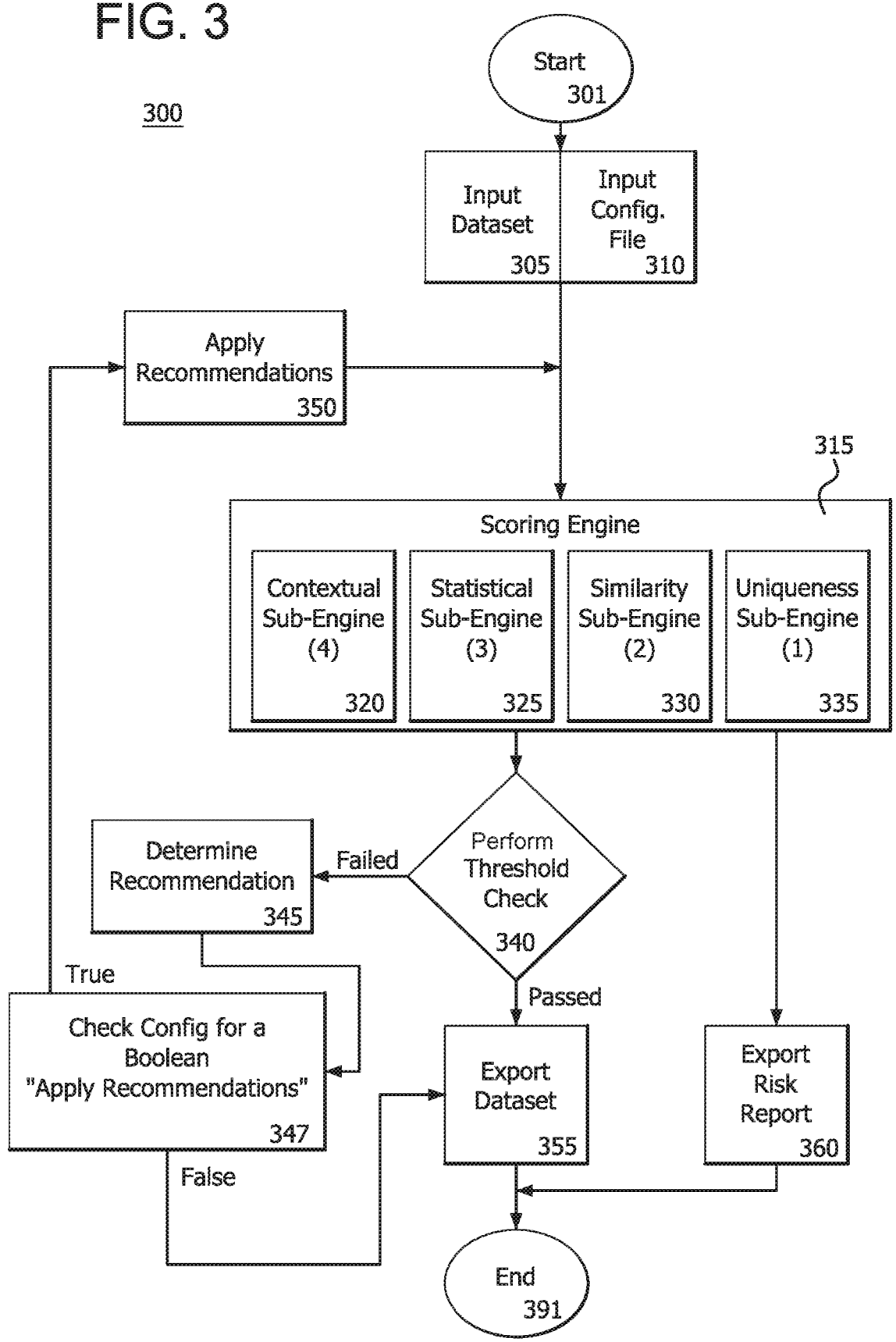
FIG. 3 illustrates a method for objective quantification and mitigation of privacy-risk performed in the system of FIG. 1.

FIG. 3 illustrates a method 300 for objective risk quantification performed in the system of FIG. 1. Method 300 starts as indicated at step 301. At step 305 one or more datasets are input and at step 310 a configuration file is input. As discussed above, the one or more input datasets may be datasets that need to be anonymized, datasets to be used for comparison purposes such as a previously or known anonymized dataset, synthesized datasets or datasets produced by executing similar code using different configuration parameters, for example, or different input data formed to represent at dataset or dataset surrogate. Further, the configuration file may take the form of a configuration object file.

The received one or more datasets from step 305 and the received configuration file from step 310 are provided to a scoring engine for scoring at step 315. The scoring engine may include one or more sub-engines. While each of scoring engine, uniqueness sub-engine, similarity sub-engine, statistical sub-engine and contextual sub-engine are described as engines, each of these includes software and the necessary hardware to perform the functions described. For example, in computer programming, an engine is a program that performs a core or essential function for other programs. Engines are used in operating systems, subsystems or application programs to coordinate the overall operation of other programs.

A first sub-engine may be the uniqueness sub-engine and scoring in the uniqueness sub-engine is performed at step 335. This scoring in the uniqueness sub-engine is further described with respect to FIG. 4.

A second sub-engine may be the similarity sub-engine and scoring in the similarity sub-engine is performed at step 330. This scoring in the similarity sub-engine is further described with respect to FIG. 5.

A third sub-engine may be the statistical sub-engine and scoring in the statistical sub-engine is performed at step 325. This scoring in the statistical sub-engine is further described with respect to FIG. 6.

A fourth sub-engine may be the contextual sub-engine and scoring in the contextual sub-engine is performed at step 320. This scoring in the contextual sub-engine is further described with respect to FIG. 7.

After scoring in the scoring engine in step 315, including by each of the sub-engines, such as uniqueness sub-engine at step 335, similarity sub-engine at step 330, statistical sub-engine at step 325 and contextual sub-engine at step 320, a threshold check is performed at step 340. If the threshold check is failed, then method 300 continues and determines a recommendation at step 345. At step 347, the CONFIG file is checked for Boolean "Apply Recommendations." If the flag at step 347 is false, the method proceeds from step 347 to step 355 and the dataset is exported as if the threshold check at step 340 passed. If the flag at step 347 is true, the determined recommendation is applied at step 350 and scoring in the scoring engine at step 315 is repeated.

If the threshold check at step 340 is passed, then the dataset is exported in step 355. The scoring engine as described in step 315, including by each of the sub-engines, such as uniqueness sub-engine at step 335, similarity sub-engine at step 330, statistical sub-engine at step 325 and contextual sub-engine at step 320, exports a risk report at step 360. Method concludes by ending at step 391.

Figure 4:
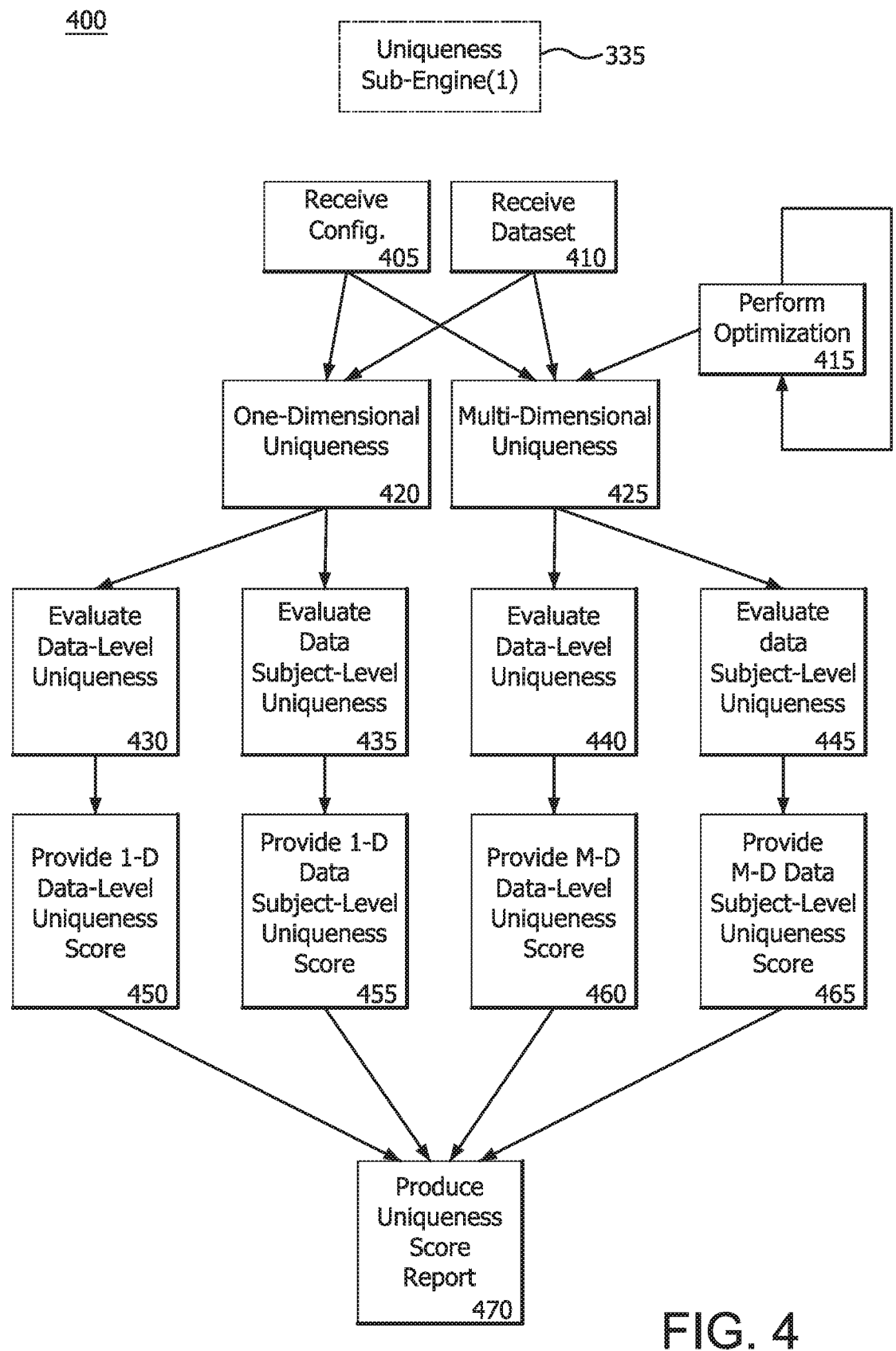
FIG. 4 illustrates a method performed by the uniqueness sub-engine of FIG. 3.

FIG. 4 illustrates a method 400 performed by the uniqueness sub-engine 335 of FIG. 3. Method 400 includes receiving the configuration file at step 405 received by the system via input configuration file at step 310 of method 300. Method 400 includes receiving the dataset(s) at step 410 received by the system via input dataset at step 305 of method 300. The uniqueness sub-engine 335 uses metrics such as data-level uniqueness and data subject-level uniqueness. The received dataset and configuration file are provided as inputs to one-dimensional uniqueness scoring at step 420 and multi-dimensional uniqueness scoring at step 425. The multi-dimensional uniqueness scoring at step 425 may be performed using an optimization at step 415. There are a set of uniqueness metrics, for example, that measure the correlation between the identifier columns and quasi-identifier columns. Optimization step 415 is for multi-dimensional uniqueness metrics and is a way to efficiently search through what could possibly be a very large number of combinations of columns. For datasets with a high number of columns, the number of combinations of these columns to explore grows exponentially. At some point, it becomes inefficient and/or infeasible to investigate every single column combination, and thus an optimization/search technique may be employed (e.g., hillclimber, Genetic Algorithm, gradient descent, simulated annealing, etc.). After the one-dimensional uniqueness split at step 420, method 400 includes evaluating data-level uniqueness at step 430 and evaluating data subject-level uniqueness at step 435. After the multi-dimensional uniqueness split at step 425, method 400 includes evaluating data-level uniqueness at step 440 and evaluating data subject-level uniqueness at step 445. The subject-level one-dimensional uniqueness metrics compute how strongly the individual quasi-identifiers are correlated with the identifier columns. The subject level multi-dimensional uniqueness metrics quantify how strongly each set of quasi-identifiers are correlated with the identifier columns. The data level uniqueness metrics ignore the number of subjects and considers the number of records in the dataset.

After evaluating data-level uniqueness at step 430, method 400 includes providing a one-dimensional data-level uniqueness score at step 450 to quantify data-level one-dimensional uniqueness. After evaluating data subject-level uniqueness at step 435, method 400 includes providing a one-dimensional data subject-level uniqueness score at step 455 to quantify data subject-level one-dimensional uniqueness.

After evaluating data-level uniqueness at step 440, method 400 includes providing a multi-dimensional data-level uniqueness score at step 460 to quantify data-level multi-dimensional uniqueness. After evaluating data subject-level uniqueness at step 445, method 400 includes providing a multi-dimensional data subject-level uniqueness score at step 465 to quantify data subject-level multi-dimensional uniqueness.

The one-dimensional data-level uniqueness score, one-dimensional data subject-level uniqueness score, multi-dimensional data-level uniqueness score and multi-dimensional data subject-level uniqueness score are combined in step 470 to produce a uniqueness score report.

Figure 5:
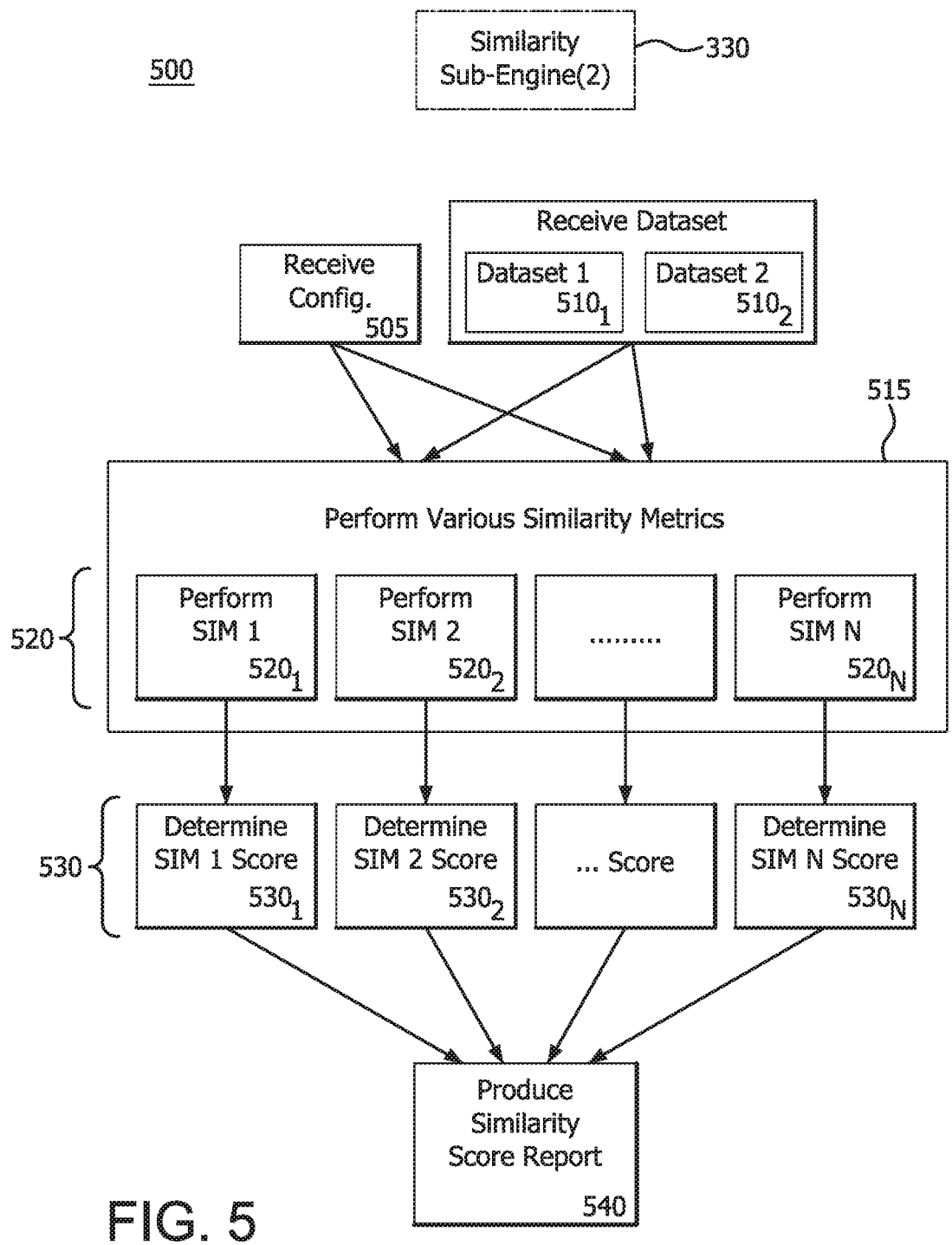
FIG. 5 illustrates a method performed by the similarity sub-engine of FIG. 3.

FIG. 5 illustrates a method 500 performed by the similarity sub-engine 330 of FIG. 3. Method 500 includes receiving the configuration file at step 505 received by the system via input configuration file at step 310 of method 300. Method 500 includes receiving at least two datasets (Datasets, $Dataset_2$) at step 510 (step $510_1$, $510_2$) received by the system via input datasets at step 305 of method 300. The similarity sub-engine 330 measures the similarity between at least two datasets, e.g., the original dataset and a modified version of that dataset. The received datasets and configuration file are provided as inputs to perform various similarity metrics at step 515. The performance of various similarity metrics may include performing specific similarity metrics across multiple dimensions in the datasets, such as performing similarity metric 1 at step $520_1$, performing similarity metric 2 at step $520_2$, . . . , and performing similarity metric N at step $520_N$ (collectively similarity metrics at step 520).

After performing the similarity metrics at step 520, scores are determined at step 530. Specifically, similarity metric 1 enables a similarity 1 score to be determined at step $530_1$, similarity metric 2 enables a similarity 2 score to be determined at step $530_2$, . . . , and similarity metric N enables a similarity N score to be determined at step $530_N$.

The similarity 1 score, similarity 2 score, . . . , and similarity N score are combined in step 540 to produce a similarity score report. In one embodiment, the similarity sub-engine 330 produces one to one (1-1), one to many (1-M), many to one (M-1), same to same (S-S), any to any (A-A) and fuzzy similarity outputs.

Figure 6:
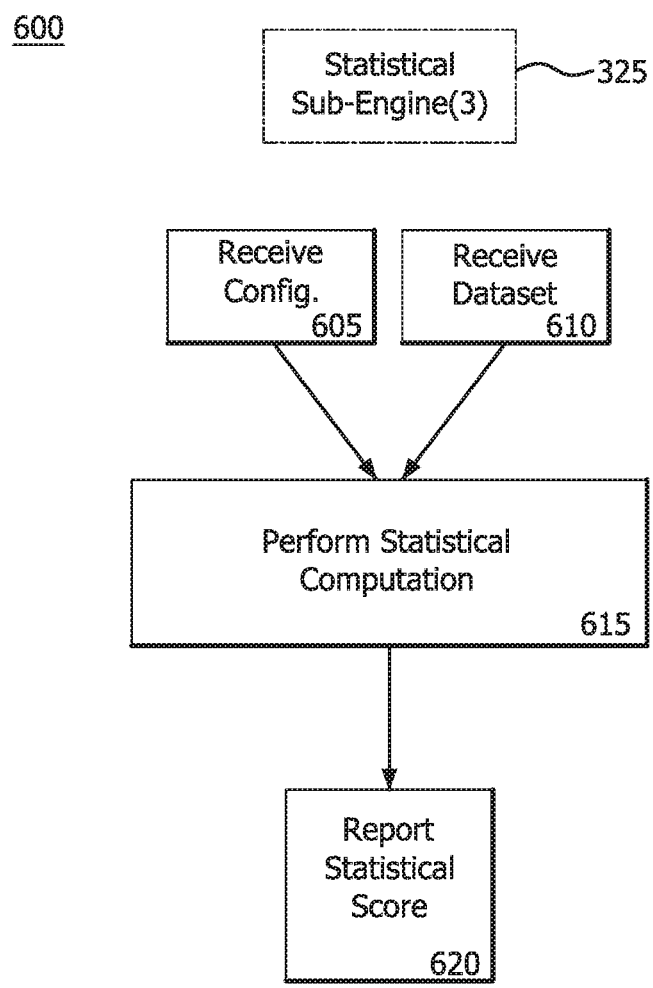
FIG. 6 illustrates a method performed by the statistical sub-engine of FIG. 3.

FIG. 6 illustrates a method 600 performed by the statistical sub-engine 325 of FIG. 3. Method 600 includes receiving the configuration file at step 605 received by the system via input configuration file at step 310 of method 300. Method 600 includes receiving the dataset at step 610 received by the system via input dataset at step 305 of method 300. At step 615, method 600 performs a statistical computation based on the received dataset and configuration file by computing statistics over various columns. The statistics may include standard deviation, median absolute deviation, and the like. Based on the performed statistical computation, method 600 reports the statistical score at step 620.

Figure 7:
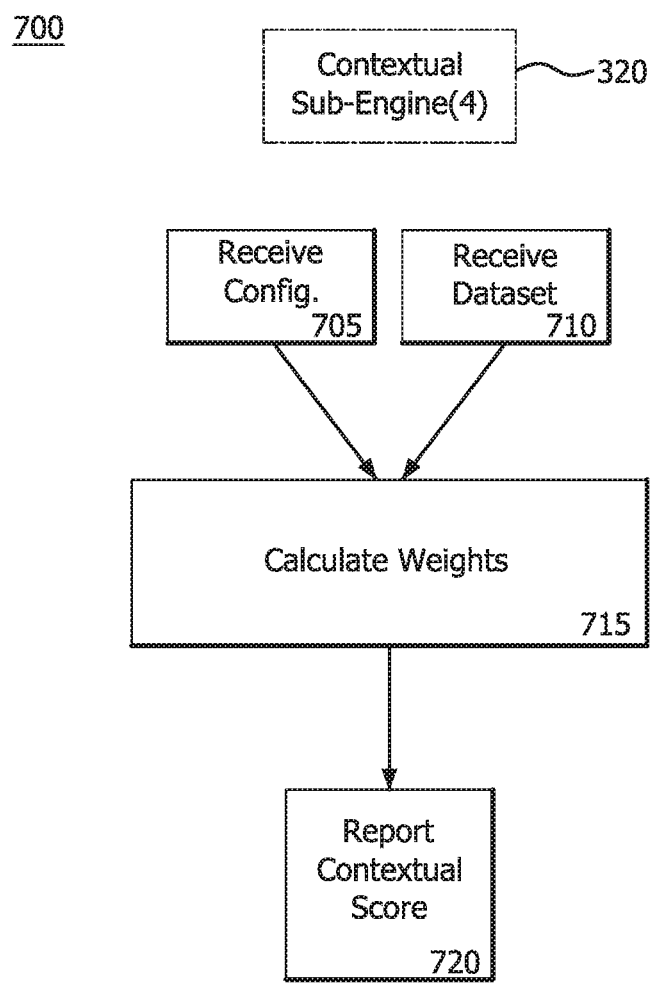
FIG. 7 illustrates a method performed by the contextual sub-engine of FIG. 3.

FIG. 7 illustrates a method 700 performed by the contextual sub-engine 320 of FIG. 3. Method 700 includes receiving the configuration file at step 705 received by the system via input configuration file at step 310 of method 300. Method 700 includes receiving the dataset at step 610 received by the system via input dataset at step 305 of method 300. At step 715, method 700 calculates weights based on the received dataset and configuration file. Contextual sub-engine 320 may have pre-defined set of weights for each contextual factor. Based on the calculated weights, method 700 reports the contextual score at step 720. For example, the factor of whether the purpose or use case of the data is defined is assigned a normalized weight of 0.4, for example.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for objective quantification and mitigation of privacy-risks within at least one dataset, the system comprising:
    a processor coupled to an input-output (IO) interface for receiving at least one input dataset, on at least one of which a measurement of the risk is to be performed, and a configuration file governing the specifications of the dataset(s), risk scoring and risk mitigation settings;
    the processor configured to:
        determine whether each of a plurality of records in a dataset is unique in its entirety or with regards to subsets of columns that comprise the record;
        compare entire records and subsets of columns from at least two input datasets to determine a level of similarity in terms of data reproduction or overlap;
        measure statistical characteristics that capture information about the at least one input dataset, the captured information used to determine a level of re-identification risk the input datasets contain;
        quantify contextual factors via weighting and producing a single context-centric score;
        identify mitigating measures to reduce the privacy-risks by considering the determined uniqueness, the compared similarity, the measure re-identification risk, and the quantified contextual factors, and
        apply mitigation techniques to the dataset based on the mitigating measures defined in the configuration file or selected from the identified mitigating measures.

2. The system of claim 1, wherein the processor computes at least one privacy-risk score and produces a risk report by accounting for contextual factors and data-centric features in the input dataset.

3. The system of claim 1, wherein the processor composes the various output scores into a single privacy-risk score.

4. The system of claim 1, wherein the processor provides a risk-based recommendation to reduce the privacy-risks in the input dataset.

5. The system of claim 1, wherein the processor computes scores for at least one of a synthetic dataset, an anonymized dataset, a raw dataset, and a row-level datasets.

6. The system of claim 1 wherein the processor uses an optimization step to identify subsets of columns that have high resolving power relative to the data subject.

7. The system of claim 1 wherein the IO interface outputs the risk output for the at least one input dataset.

8. The system of claim 1 wherein the processor provides actions to mitigate each privacy-risk identified.

9. The system of claim 1 wherein the system minimizes overt re-identification risks.

10. The system of claim 9 wherein the re-identification risks include potential risks specified in the configuration file.

11. The system of claim 1 wherein the mitigation techniques include at least one of deletion, multiplication, redaction suppression, and fuzzing, generalization, noise addition, aggregation and masking.

12. A method for objective quantification and mitigation of privacy-risks of a dataset, the method comprising:
    receiving, via an input-output (IO) interface, at least one input dataset, on at least one of which a measurement of the risk is to be performed, and a configuration file governing the risk assessment;
    determining the uniqueness of each of a plurality of records in a dataset, where uniqueness is computed at data subject-level, or data-level by considering only one column or a combination of several columns;
    calculating a level of similarity by comparing entire records and subsets of columns from at least two input datasets;
    computing a level of re-identification risk based on the statistical characteristics that capture information about the at least one input dataset;
    quantifying contextual factors via weighting and producing a single context-centric score;
    identifying mitigating measures to reduce the privacy-risks by taking in to account the uniqueness, the level of similarity, the level of re-identification, and the contextual factors; and
    applying mitigation techniques to the generated dataset based on the mitigating measures.

13. The method of claim 12, further comprising computing at least one privacy-risk score and producing a risk report by accounting for contextual factors and datacentric features in the input dataset.

14. The method of claim 12 wherein an optimization step is used to identify subsets of columns that have high resolving power relative to the data subject.

15. The method of claim 12, further composing the various output scores into a single privacy-risk score.

16. The method of claim 12, wherein at least one risk-based recommendation is provided to reduce the privacy-risks in the input dataset.

17. The method of claim 12, wherein the IO interface outputs the risk output for the at least one input dataset.

18. A non-transitory computer readable medium storing a program for objective quantification and mitigation of privacy-risks of a dataset, wherein the program, when executed by a processor, causes the processor to:
    receive, via an input-output (IO) interface, at least one input dataset, on at least one of which a measurement of the risk is to be performed, and a configuration file governing the risk assessment;
    determine the level of uniqueness within the dataset by considering one column or a combination of columns using subject-level and data-level uniqueness metrics;
    calculate a level of similarity by comparing entire records and subsets of columns from at least two input datasets;
    compute a level of re-identification risk based on the statistical characteristics that capture information about the at least one input dataset;
    quantify contextual factors via weighting and producing a single context-centric score;

identify mitigating measures to reduce the privacy-risks by taking in to account the uniqueness, the level of similarity, the level of re-identification, and the contextual factors; and apply the mitigation techniques to the generated dataset based on the mitigating measures.

19. The non-transitory computer readable medium of claim 18, further comprising computing at least one privacy-risk score and producing a risk report by accounting for contextual factors and datacentric features in the input dataset.

20. The non-transitory computer readable medium of claim 18, further composing the various output scores into a single privacy-risk score.

* * * * *